(12) United States Patent
Iyasu et al.

(10) Patent No.: US 12,149,179 B2
(45) Date of Patent: Nov. 19, 2024

(54) POWER CONVERTER WITH CONTROLLER ALTERNATELY TURNING ON SWITCHES

(71) Applicant: DENSO CORPORATION, Kariya (JP)

(72) Inventors: Seiji Iyasu, Nisshin (JP); Syuji Kurauchi, Kariya (JP); Yuuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 17/709,806

(22) Filed: Mar. 31, 2022

(65) Prior Publication Data

US 2022/0271684 A1    Aug. 25, 2022

Related U.S. Application Data

(63) Continuation of application No. PCT/JP2020/037027, filed on Sep. 29, 2020.

(30) Foreign Application Priority Data

Oct. 1, 2019 (JP) ................................. 2019-181705

(51) Int. Cl.
*H02M 3/335* (2006.01)
*H02M 1/00* (2007.01)

(52) U.S. Cl.
CPC ..... *H02M 3/33573* (2021.05); *H02M 1/0025* (2021.05); *H02M 3/33561* (2013.01); *H02M 3/33576* (2013.01)

(58) Field of Classification Search
CPC ......... H02M 3/33573; H02M 3/33576; H02M 3/33592; H02M 3/33584; H02M 3/33569;
(Continued)

(56) References Cited

U.S. PATENT DOCUMENTS 10,804,808 B1 * 10/2020 Fu ...................... H02M 3/33576
12,021,440 B2 * 6/2024 Ishibashi ........... H02M 3/33592
(Continued)

FOREIGN PATENT DOCUMENTS

CN    106655785 A    5/2017
CN    107104588 A    8/2017
(Continued)

*Primary Examiner* — Gustavo A Rosario-Benitez
(74) *Attorney, Agent, or Firm* — Oliff PLC

(57) ABSTRACT

A power converter includes a full-bridge circuit, power converting circuit, transformer, and controller. The full-bridge circuit includes a series-connected unit made of first and second switches and a series-connected unit made of third and fourth switches and is connected to power transmitting terminals. The power converting circuit is connected to power receiving terminals. The transformer includes power transmitting coil and power receiving coil. The power transmitting coil is connected to full-bridge circuit. The power receiving coil is connected to power converting circuit. The controller turns on the first and second switches alternately and also the third and fourth switches alternately. A resistive load is connected to the power receiving terminals. The controller serves to determine a phase difference between the time when first switch is turned on and the time when third switch is turned on to decrease with a decrease in measured voltage developed at the power receiving terminals.

8 Claims, 14 Drawing Sheets

(58) Field of Classification Search
CPC ............. H02M 1/0003; H02M 1/0025; H02M 1/0016; H02M 1/0019
See application file for complete search history.

(56) References Cited

U.S. PATENT DOCUMENTS

| | | | | |
|---|---|---|---|---|
| 2013/0272032 A1* | 10/2013 | Mueller | ............ | H02M 3/33573 363/17 |
| 2015/0263646 A1* | 9/2015 | Hara | ........................ | B60L 50/66 363/17 |
| 2015/0295503 A1* | 10/2015 | Muto | ................ | H02M 3/33584 363/17 |
| 2015/0349649 A1* | 12/2015 | Zane | ................ | H02M 3/33507 363/21.03 |
| 2016/0336866 A1* | 11/2016 | Yamamoto | ........ | H02M 3/33584 |
| 2016/0352236 A1* | 12/2016 | Yoo | ................... | H02M 3/33584 |
| 2019/0052181 A1 | 2/2019 | Murthy-Bellur et al. | | |
| 2020/0287468 A1* | 9/2020 | Mizutani | ........... | H02M 7/53871 |

FOREIGN PATENT DOCUMENTS

| | | | |
|---|---|---|---|
| CN | 108134405 A | 6/2018 | |
| JP | 6140602 B2 | 5/2017 | |

\* cited by examiner

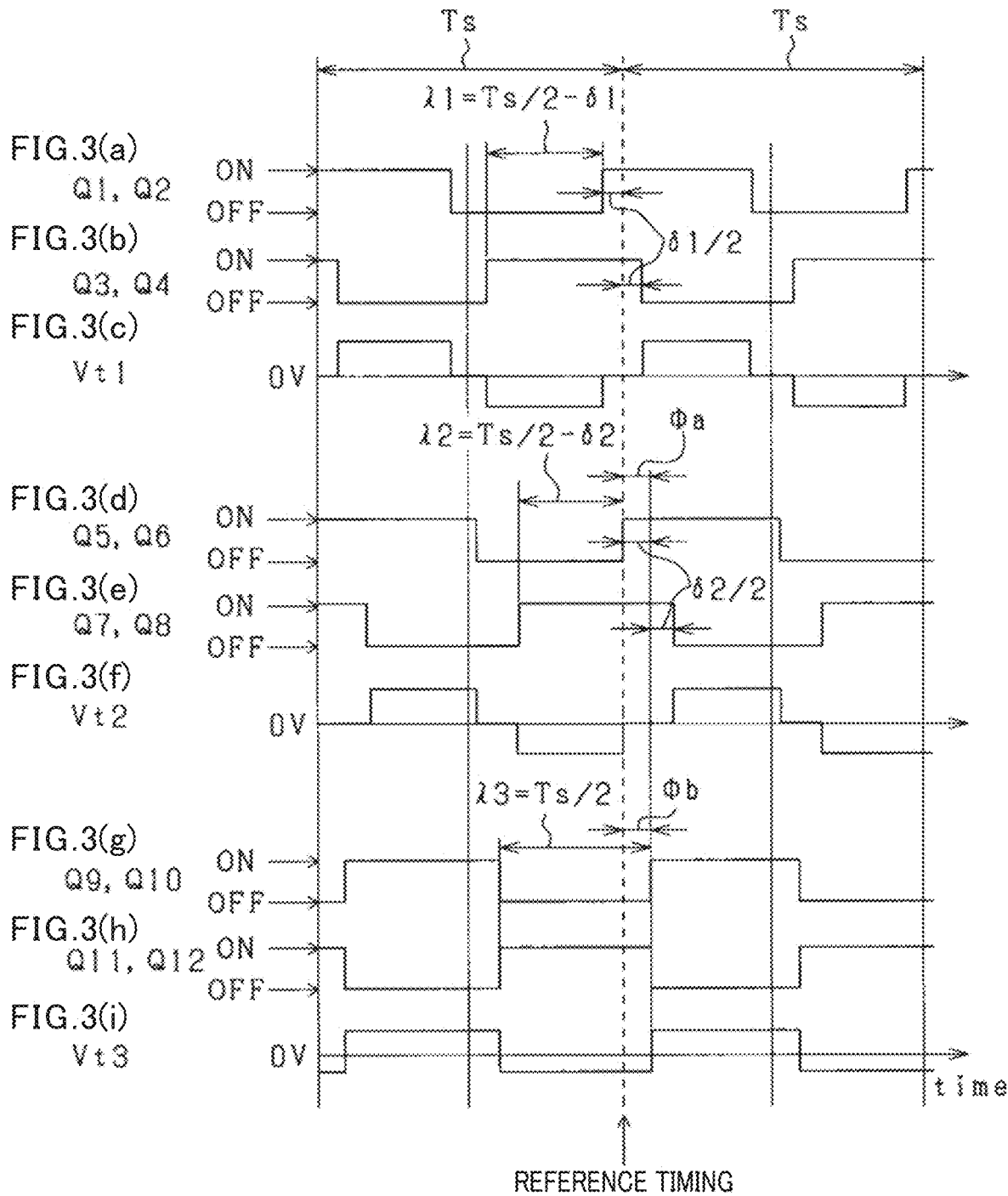

THIS EMBODIMENT

COMPARATIVE EXAMPLE

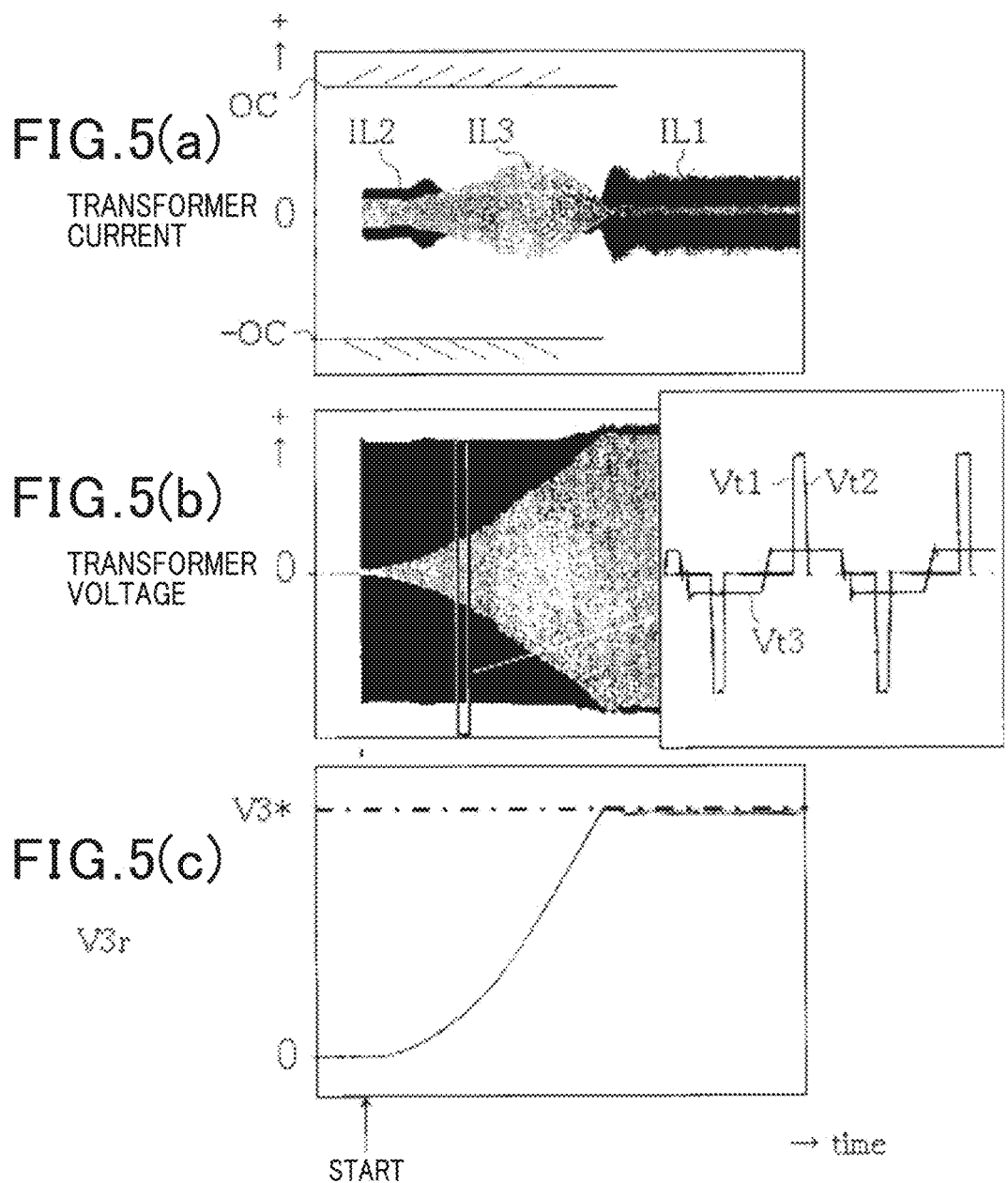

<COMPARATIVE EXAMPLE>
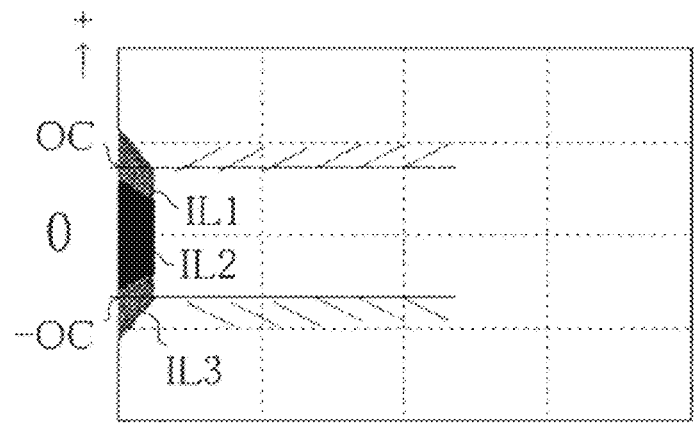
FIG.6(a) TRANSFORMER CURRENT
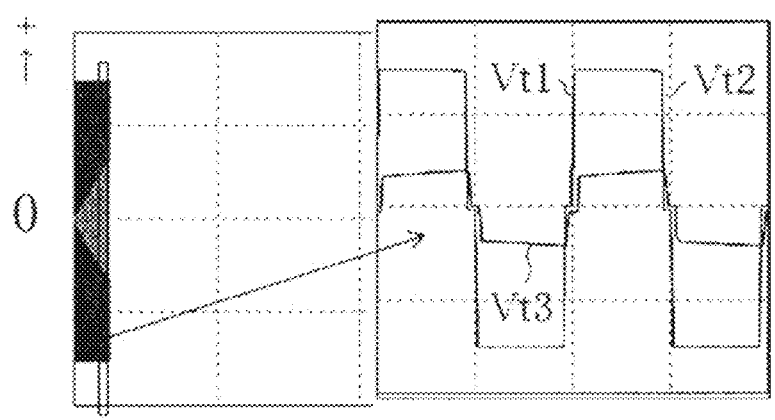
FIG.6(b) TRANSFORMER VOLTAGE
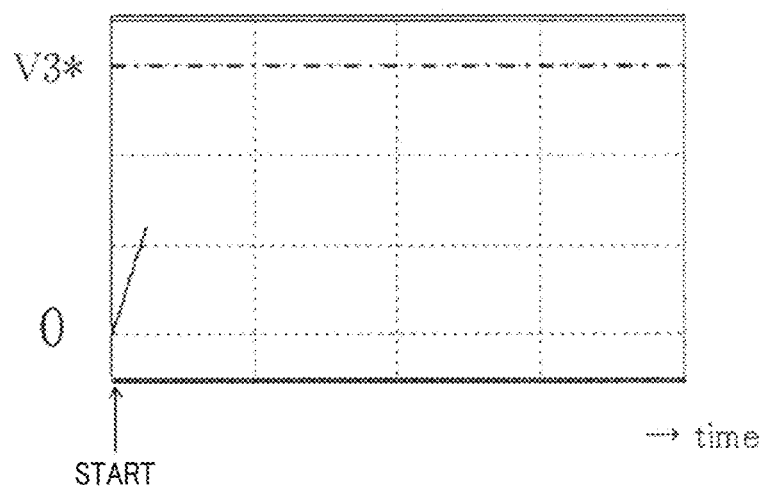
FIG.6(c) V3r

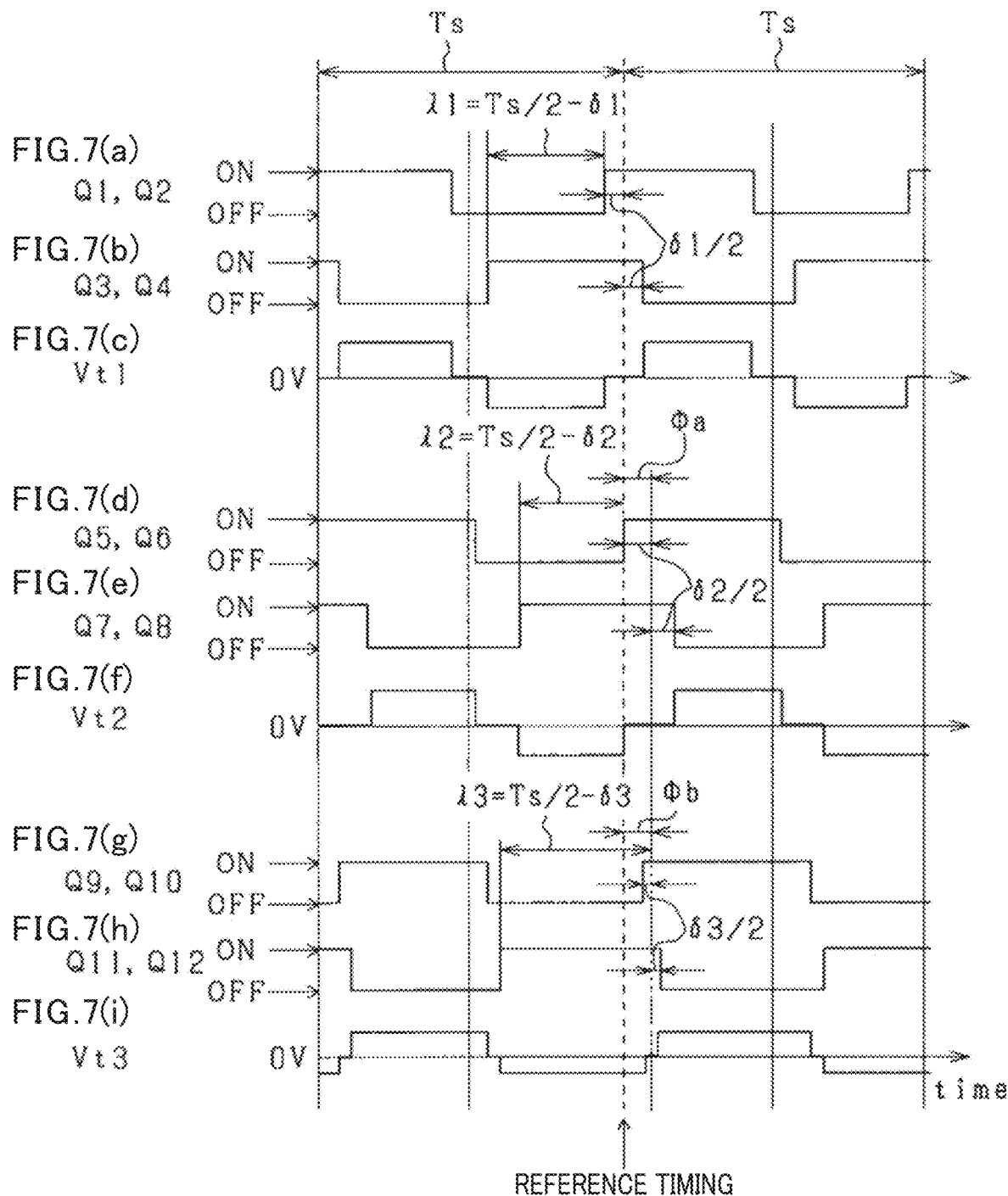

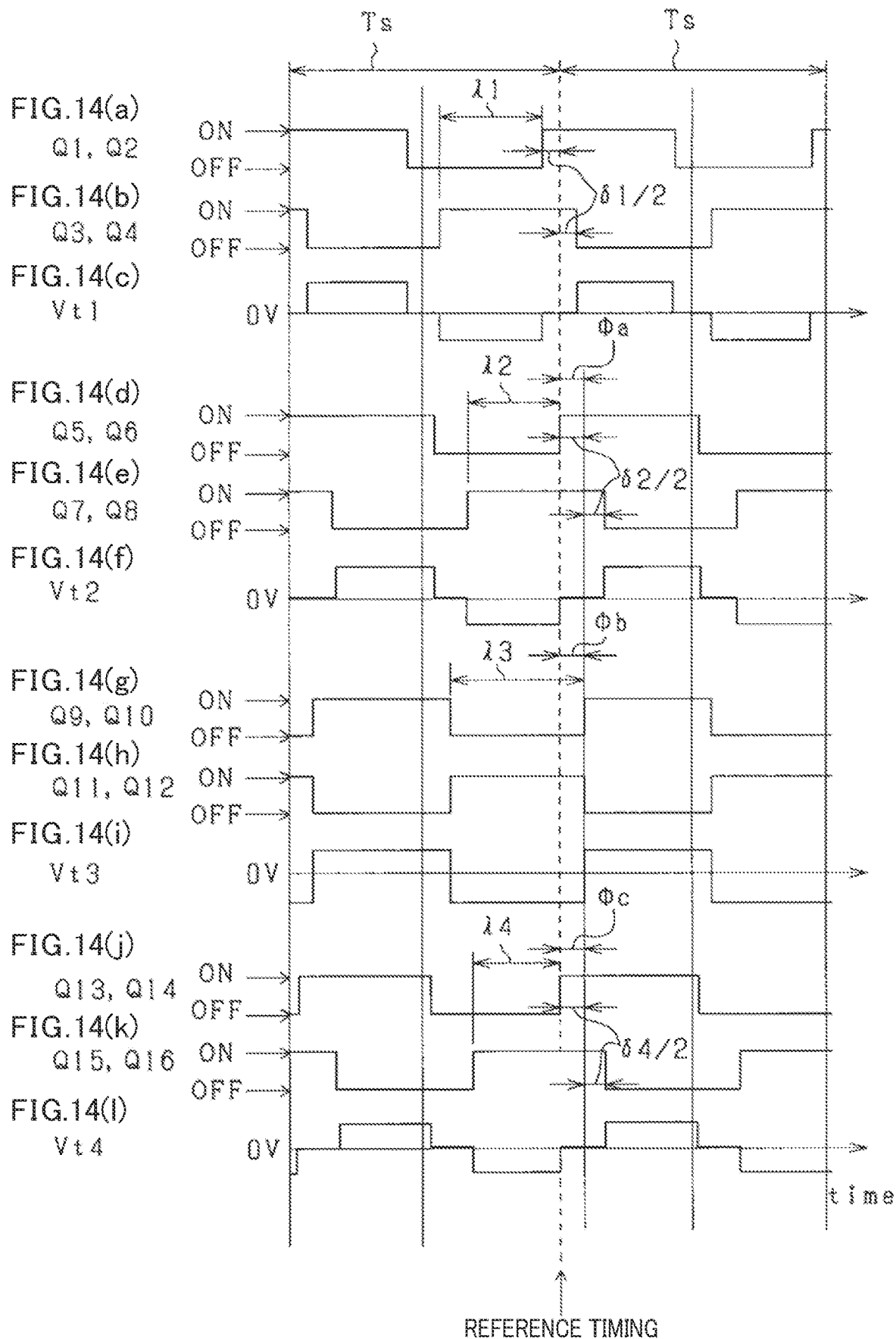

POWER CONVERTER WITH CONTROLLER ALTERNATELY TURNING ON SWITCHES

CROSS REFERENCE TO RELATED DOCUMENT

The present application claims the benefit of priority of Japanese Patent Application No. 2019-181705 filed on Oct. 1, 2019 the disclosure of which is incorporated in its entirety herein by reference.

TECHNICAL FIELD

This disclosure in this application relates generally to a power converter.

BACKGROUND ART

Power converters are known which, as taught in patent literature 1, include a power transmitting terminal and a power receiving terminal and work to output electrical power, as inputted into the power transmitting terminal, from the power receiving terminal. Specifically, such a type of power converter is equipped with a full-bridge circuit, an electrical power converting circuit, a transformer, and a controller. The full-bridge circuit includes a series-connected unit made up of a first switch and a second switch and a series-connected unit made up of a third switch and a fourth switch. The series-connected units are connected to the power transmitting terminal. The power converting circuit is connected to the power receiving terminal.

The transformer includes a power transmitting coil and a power receiving coil. The power transmitting coil is connected to the full-bridge circuit. The power receiving coil is electrically connected to the power converting circuit and magnetically coupled with the power transmitting coil.

The controller works to turn on the first switch and the second switch alternately and also turn on the third switch and the fourth switch alternately, thereby outputting electrical power, as inputted into the power transmitting terminal, from the power receiving terminal through the full-bridge circuit, the transformer, and the power converting circuit.

PRIOR ART DOCUMENT

Patent Literature

PATENT LITERATURE 1 Japanese Patent No. 6140602

SUMMARY OF THE INVENTION

The power receiving terminal sometimes has a resistive load, such as a heater, connected thereto. The connection of the resistive load to the power receiving terminal will cause the voltage appearing at the power receiving terminal to be lower in level (e.g., 0V) than that when a storage battery is connected to the power receiving terminal. This results in an increased difference in effective level of voltage between the power transmitting coil and the power receiving coil when the electrical power is inputted to the power transmitting terminal, which leads to a risk that overcurrent may flow through the transformer, the power converting circuit, or the resistive load.

It is a principal object of this disclosure to provide a power converter which is capable of minimizing a risk that overcurrent may flow through a transformer, a power converting circuit, or a resistive load.

This disclosure is to provide a power converter which is equipped with power transmitting terminals and power receiving terminals and to which a resistive load is connected to the power receiving terminal. The power converter comprises: (a) a full-bridge circuit which includes a series-connected unit made of a first switch and a second switch and a series-connected unit made of a third switch and a fourth switch, each of the series-connected units being connected to the power transmitting terminals; (b) a power converting circuit which is connected to the power receiving terminals; (c) a transformer which includes a power transmitting coil and a power receiving coil, the power transmitting coil being connected to the full-bridge circuit, the power receiving coil being connected to the power converting circuit and magnetically coupled with the power transmitting coil; (d) a power receiving voltage sensor which measures voltage developed at the power receiving terminals; and (e) a controller which works to turn on the first switch and the second switch alternately and also turn on the third switch and the fourth switch alternately. The controller serves to determine a phase difference between a time when the first switch is turned on and a time when the third switch is turned on to decrease with a decrease in voltage at the power receiving terminals which is measured by the power receiving voltage sensor.

Decreasing the phase difference between the time when the first switch is turned on and the time when the third switch is turned on will result in a decreased difference between effective values of voltage at the power transmitting coil and the power receiving coil. In view of this fact, the power converter is designed to decrease the above phase difference as the level of voltage at the power receiving terminals is lowered. This minimizes a risk that overcurrent may flow through the transformer, the power converting circuit, and the resistive load.

BRIEF DESCRIPTION OF THE DRAWINGS

The above described object, and other objects, features, or beneficial advantages in this disclosure will be apparent from the appended drawings or the following detailed discussion.

FIGS. 3(a) to 3(i) are timing charts which demonstrate sequences of operations of switches and a change in transformer voltage.

FIGS. 5(a), 5(b), and 5(c) are timing charts which represent changes in transformer current and transformer voltage according to the first embodiment.

FIGS. 6(a), 6(b), and 6(c) are timing charts which represent changes in transformer current and transformer voltage in a comparative example.

FIGS. 7(a) to 7(i) are timing charts which demonstrate sequences of operations of switches and a change in transformer voltage in a modification of the first embodiment.

FIGS. 14(a) to 14(l) are timing charts which demonstrate sequences of operations of switches and a change in transformer voltage.

MODE FOR CARRYING OUT THE INVENTION

First Embodiment

The first embodiment of a power converter in this disclosure will be described below with reference to the drawings. The power converter in this embodiment is of a multi-port type and mounted in electric-powered vehicles, such as plug-in hybrid vehicles (PHEVs) or electric vehicles (EVs).

Figure 1:
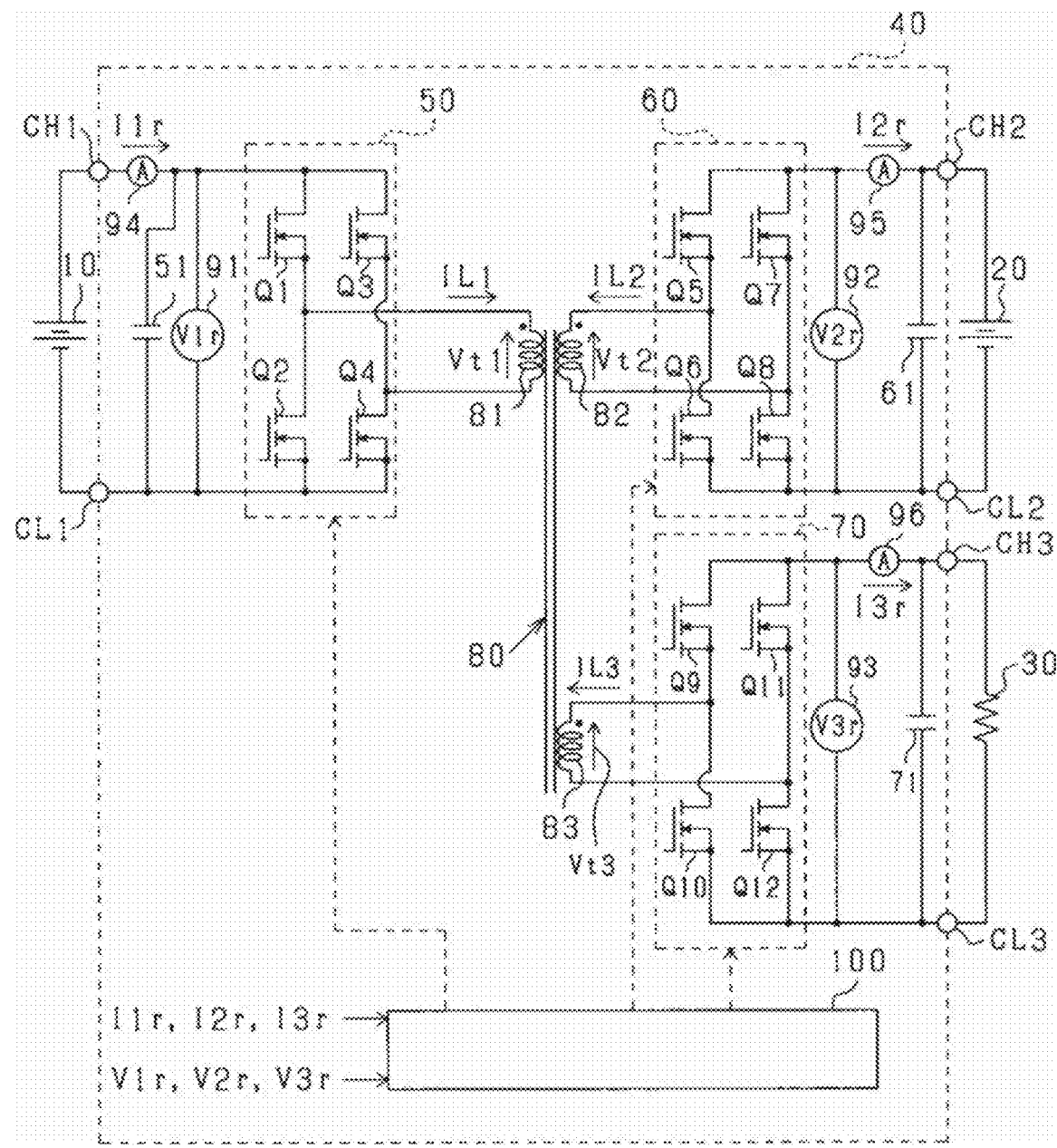
FIG. 1 is a view which illustrates a power converter according to the first embodiment.

A power supply system, as illustrated in FIG. 1, includes the first storage battery 10, the second storage battery 20, the resistive load 30, and the power converter 40. Each of the first and second storage batteries 10 and 20 is made of a rechargeable secondary battery, such as a lithium ion storage battery or a nickel-metal hydride storage battery. The second storage battery 20 as a voltage rating of, for example, 200V.

The power converter 40 is equipped with the first full-bridge circuit 50. The first full-bridge circuit 50 includes the first to fourth switches Q1 to Q4 and the first capacitor 51. In this embodiment, the first to fourth switches Q1 to Q4 are each implemented by an n-channel MOSFET. The first switch Q1 and the third switch Q3 are connected at drains thereof to the first high-potential terminal CH1 of the power converter 40. The first switch Q1 is connected at a source thereof to a drain of the second switch Q2. The third switch Q3 is connected at a source thereof to a drain of the fourth switch Q4. The second switch Q2 and the fourth switch Q4 are connect at sources thereof to the first low-potential terminal CL1 of the power converter 40. The first high-potential terminal CH1 is connected to a first end of the first capacitor 51 and a positive terminal of the first storage battery 10. The first low-potential terminal CL1 is connected to a second end of the first capacitor 51 and a negative terminal of the first storage battery 10.

The first high-potential terminal CH1 and the first low-potential terminal CL1 may alternatively be connected to an output of an AC-DC converter which works to convert an alternating-current power, as inputted from an external power source, into a direct-current power instead of the first storage battery 10. The first high-potential terminal CH1 and the first low-potential terminal CL1 serve as power transmitting terminals.

The power converter 40 is equipped with the second full-bridge circuit 60. The second full-bridge circuit 60 includes the fifth to eighth switches Q5 to Q8 and the second capacitor 61. The fifth to eighth switches Q5 to Q8 are each made of an n-channel MOSFET. The fifth switch Q5 and the seventh switch Q7 are connected at drains thereof to the second high-potential terminal CH2 of the power converter 40. The fifth switch Q5 is connected at a source thereof to a drain of the sixth switch Q6. The seventh switch Q7 is connected at a source thereof to a drain of the eighth switch Q8. The sixth switch Q6 and the eighth switch Q8 are connected at sources thereof to the second low-potential terminal CL2 of the power converter 40. The second high-potential terminal CH2 is connected to a first terminal of the second capacitor 61 and a positive terminal of the second storage battery 20. The second low-potential terminal CL2 is connected to a second end of the second capacitor 61 and a negative terminal of the second storage battery 20.

The power converter 40 also includes the third full-bridge circuit 70 working as a power converting circuit. The third full-bridge circuit 70 is equipped with the ninth to twelfth switches Q9 to Q12 and the third capacitor 71. The ninth to twelfth switches Q9 to Q12 are each made of an n-channel MOSFET. The ninth switch Q9 and the eleventh switch Q11 are connected at drains thereof to the third high-potential terminal CH3 of the power converter 40. The ninth switch Q9 is connected at a source thereof to a drain of the tenth switch Q10. The eleventh switch Q11 is connected at a source thereof to a drain of the twelfth switch Q12. The tenth switch Q10 and the twelfth switch Q12 are connected at sources thereof to the third low-potential terminal CL3 of the power converter 40. The third high-potential terminal CH3 is connected to a first terminal of the third capacitor 71 and a first terminal of the resistive load 30. The third low-potential terminal CL3 is connected to a second terminal of the third capacitor 71 and a second terminal of the resistive load 30. The third high-potential terminal CH3 and the third low-potential terminal CL3 serve as power receiving terminals. The ninth to twelfth switches Q9 to Q12 serve as first to fourth converter switches.

The resistive load 30 includes a resistor electrically connecting the third high-potential terminal CH3 and the third low-potential terminal CL3 together. In this embodiment, the resistive load 30 is implemented by a heater which generates thermal energy through the resistor supplied with electrical power. The resistive load 30 is an electrical device which, unlike a storage battery, does not have a voltage higher than 0V before the power converter 40 is activated. In this embodiment, the third high-potential terminal CH3 and the third low-potential terminal CL3 are connected only to the resistive load 30, but not to a storage battery. The resistive load 30 may alternatively be implemented by an electrical device other than the heater.

The power converter 40 is also equipped with the transformer 80 which includes the first coil 81 serving as a power transmitting coil, the second coil 82, and the third coil 83 which serve as power receiving coils. The first coil 81 is connected at a first end thereof to the source of the first switch Q1 and the drain of the second switch Q2. The first coil 81 is also connected at a second end thereof to the source of the third switch Q3 and the drain of the fourth switch Q4. The second coil 82 is connected at a first end thereof to the source of the fifth switch Q5 and the drain of the sixth switch Q6. The second coil 82 is also connected at a second end thereof to the source of the seventh switch Q7 and the drain of the eighth switch Q8. The third coil 83 is connected at a first end thereof to the source of the ninth switch Q9 and the drain of the tenth switch Q10. The third coil 83 is also connected at a second end thereof to the source of the eleventh switch Q11 and the drain of the twelfth switch Q12.

The first coil 81, the second coil 82, and the third coil 83 are magnetically coupled with each other through, for example, a core installed in the transformer 80. When the potential at the first end of the first coil 81 is higher than that at the second end thereof, it will cause voltage to be induced at each of the second coil 82 and the third coil 83 to develop the potential at the first end thereof which is higher than that at the second end thereof. Alternatively, when the potential at the second end of the first coil 81 is higher than that at the first end thereof, it will cause voltage to be induced at each of the second coil 82 and the third coil 83 to develop the potential at the second end thereof which is higher than that at the first end thereof.

The power converter 40 also includes the first to third voltage sensors 91 to 93 and the first to third current sensors 94 to 96. The first voltage sensor 91 measures the first voltage V1r that is a terminal voltage at the first capacitor 51. The second voltage sensor 92 measures the second voltage V2r that is a terminal voltage at the second capacitor 61. The third voltage sensor 93 measures the third voltage V3r that is a terminal voltage at the third capacitor 71. In this embodiment, the first voltage sensor 91 will also be referred to below as a power transmitting voltage sensor. The third voltage sensor 93 will also be referred to below as a power receiving voltage sensor.

The first current sensor 94 measures the first current I1r flowing through the first high-potential terminal CH1. The second current sensor 95 measures the second current I2r flowing between the second full-bridge circuit 60 and the second high-potential terminal CH2. The third current sensor 96 measures the third current I3r flowing between the third full-bridge circuit 70 and the third high-potential terminal CH3. In this embodiment, the first current I1r flowing through the first high-potential terminal CH1 from the positive terminal of the first storage battery 10 toward the first full-bridge circuit 50 is defined to be positive. The second current I2r flowing through the second high-potential terminal CH2 from the second full-bridge circuit 60 toward the second storage battery 20 is defined to be positive. The third current I3r flowing through the third high-potential terminal CH3 from the third full-bridge circuit 70 toward the resistive load 30 is defined to be positive.

Figure 2:
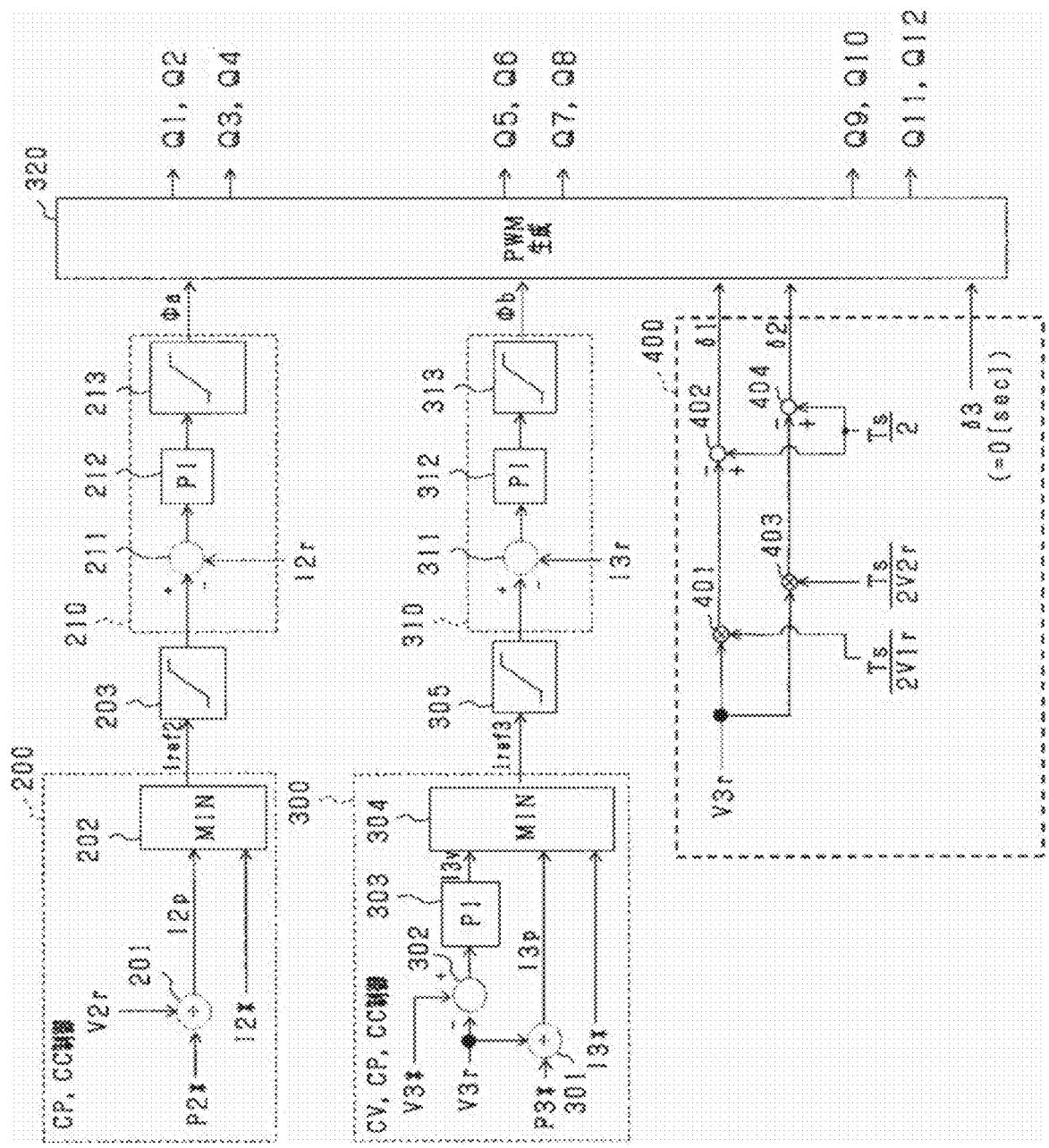
FIG. 2 is a block diagram which shows tasks executed by a controller.

Parameters measured by the sensors 91 to 96 are inputted to the controller 100 installed in the power converter 40. The controller 100 works turn on or off the first to twelfth switches Q1 to Q12. The operation of the controller 100 will be described below with reference to FIG. 2. FIG. 2 is a block diagram which demonstrates tasks performed by the controller 100.

The controller 100 includes the first command current determiner 200 and the first current controller 210. The first command current determiner 200 includes the first current determiner 201 and the first minimum value selector 202. The first current determiner 201 divides the second command electrical power P2* inputted thereto by the second voltage V2r detected by the second voltage sensor 92 to derive the command current I2p that is a command for a charging current required to flow into the second storage battery 20. The command current I2p is provided to supply electrical power to the second storage battery 20 using constant power control (CP). When the sign of the command current I2p is positive, the command current I2p will flow through the second high-potential terminal CH2 to charge the second storage battery 20. When the second command electrical power P2* inputted to the first command current determiner 200 is zero, the command current I2p will be zero.

The first minimum value selector 202 select the lower of the command current I2p, as calculated by the first current determiner 201, and the second constant current command I2* as the second command current Iref2. The second constant current command I2* is provided to supply electrical power to the second storage battery 20 using the constant power control (CP). The second command current Iref2 outputted from the first minimum value selector 202 has an upper limit or a lower limit controlled by the limiter 203.

The first current controller 210 includes the first current deviation calculator 211, the first feedback controller 212, and the first limiter 213. The first current deviation calculator 211 subtracts the second current I2r, as detected by the second current sensor 95, from the second command current Iref2 outputted from the limiter 203 to derive the second current deviation ΔI2.

The first feedback controller 212 calculates the first command phase φa as a variable required to bring the second current deviation ΔI2 into agreement with zero in the feedback control mode. In this embodiment, the feedback control mode is implemented by a proportional-integral control mode. The first command phase φa will be described later in detail. The feedback control mode executed by the first feedback controller 212 is, as described above, achieved by the proportional-integral control mode, but instead may be optional, e.g., a proportional-integral-derivative mode may be employed instead.

The first command phase φa calculated by the first feedback controller 212 has an upper limit and a lower limit which is limited by the first limiter 213 and is inputted into the PWM generator 320 installed in the controller 100.

The controller 100 includes the second command current calculator 300 and the second current controller 310. The second command current calculator 300 is equipped with the second current calculator 301, the adder 302, the feedback controller 303, and the second minimum value selector 304. The second current calculator 301 divides the third command electrical power P3* inputted thereto by the third voltage V3r detected by the third voltage sensor 93 to derive the command current I3p delivered to the third high-potential terminal CH3. The command current I3p is determined in the constant power control (CP) in order to supply electrical power to the resistive load 30 and the third capacitor 71. When the sign of the command current I3p is positive, it will cause electrical current to flow through the third high-potential terminal CH3 from the third high-potential terminal CH3 to the resistive load 30.

The adder 302 subtracts the third voltage V3r from the target value V3* of voltage applied to the resistive load 30 and the third capacitor 71 to calculate the voltage deviation ΔV. The feedback controller 303 calculates the command current I3v that is a variable required to bring the voltage deviation ΔV into agreement with zero in the feedback control mode. In this embodiment, the feedback control mode is implemented by a proportional-integral control mode. The command current I3v is provided to deliver electrical power to the resistive load 30 and the third capacitor 71 in the constant voltage control (CV). The feedback control mode executed by the feedback controller 303 is, as described above, achieved by the proportional-integral control mode, but rather may be optional, e.g., a proportional-integral-derivative mode may be employed instead.

The second minimum value selector 304 subtracts the smallest of the command current I3p calculated by the second current calculator 301, the command current I3v calculated by the feedback controller 303, and the third constant current command I3* as the third command current Iref3. The third constant current command I3* is provided to supply electrical power to the resistive load 30 and the third capacitor 71 in the constant current control. The third command current Iref3 outputted from the second minimum value selector 304 has an upper limit or a lower limit which is controlled by the limiter 305.

The second current controller 310 includes the second current deviation calculator 311, the second feedback controller 312, and the second limiter 313. The second current deviation calculator 311 subtracts the third current I3r detected by the third current sensor 96 from the third command current Iref3 outputted from the limiter 305 to derive the third current deviation ΔI3.

The second feedback controller 312 calculates the second command phase φb as a variable used in bringing the third current deviation ΔI3 into agreement with zero in the feedback control mode. In this embodiment, the feedback control mode is implemented by a proportional-integral control mode. The second command phase φb will be described later in detail. The feedback control mode executed by the second feedback controller 312 is, as described above, achieved by the proportional-integral control mode, but rather may be optional, e.g., a proportional-integral-derivative mode may be employed instead.

The second command phase φb calculated by the second feedback controller 312 has an upper limit or a lower limit controlled by the second limiter 313 and inputted into the PWM generator 320. The second command current calculator 300, the limiter 305, and the second current controller 310 serve as a second calculator.

The controller 100 is equipped with the phase calculator 400. The phase calculator 400 works to calculate first to third designated times 61 to 63. In this embodiment, the third designated time δ3 is selected to be zero.

The first designated time δ1 (≥0) is given by the following equation eq1.

$$\delta 1 = \frac{Ts}{2}\left(1 - \frac{V3r}{V1r} \cdot \frac{N1}{N3}\right) \qquad \text{eq 1}$$

where Ts denotes a switching cycle of the first to twelfth switches Q1 to Q12, N1 denotes the number of turns of the first coil 81, and N3 denotes the number of turns of the third coil 83. In this embodiment, N1=N2, Eq. eq1 is rewritten as the following equation eq2.

$$\delta 1 = \frac{Ts}{2}\left(1 - \frac{V3r}{V1r}\right) \qquad \text{eq 2}$$

The second designated time δ2 (≥0) is given by the following equation eq3.

$$\delta 2 = \frac{Ts}{2}\left(1 - \frac{V3r}{V2r} \cdot \frac{N2}{N3}\right) \qquad \text{eq 3}$$

where N2 denotes the number of turns of the second coil 82. Since N2=N3 in this embodiment, Eq. eq3 is rewritten as the following equation eq4.

$$\delta 2 = \frac{Ts}{2}\left(1 - \frac{V3r}{V2r}\right) \qquad \text{eq 4}$$

Next, how to calculate the designated time δ1 and the second designated time δ2 will be discussed.

In the phase calculator 400, the first multiplier 401 calculates Ts×V3r/(2×V1r) using the first voltage V1r, the third voltage V3r, and the switching cycle Ts. The first calculator 402 subtracts a value calculated by the first multiplier 401 from Ts/2 to derive the first designated time δ1. The first designated time δ1 is then inputted to the PWM generator 320. The first multiplier 401 and the first calculator 402 serve as a first calculator.

The second multiplier 403 calculates Ts×V3r/(2×V2r) using the second voltage V2r, the third voltage V3r, and the switching cycle Ts. The second calculator 404 subtracts a value calculated by the second multiplier 403 from Ts/2 to derive the second designated time δ2. The second designated time δ2 is then inputted to the PWM generator 320.

The PWM generator 320 works to produce drive signals for the switches Q1 to Q12 using the first command phase φa, the second command phase φb, the first designated time δ1, the second designated time δ2, and the third designated time δ3 (=0) and output them to the gates of the switches Q1 to Q12. The operations of the switches Q1 to Q12 will be described below using FIGS. 3(a) to 3(i).

FIGS. 3(a) and 3(b) demonstrate sequences of operations of the first to fourth switches Q1 to Q4. FIG. 3(c) represents a change in voltage Vt1 appearing at the first coil 81. FIGS. 3(d) and 3(e) represent sequences of operations of the fifth to eighth switches Q5 to Q8. FIG. 3(f) represents a change in voltage Vt2 at the second coil 82. FIGS. 3(g) and 3(h) demonstrate sequences of operations of the ninth to twelfth switches Q9 to Q12. FIG. 3(i) represents a change in voltage Vt3 at the third coil 83.

The first switch Q1 and the second switch Q2 are turned on alternately. The third switch Q3a and the fourth switch Q4 are turned on alternately. The time when the third switch Q3 is turned off is delayed the first designated time δ1 from the time when the first switch Q1 is turned on. In other words, if Ts/2−δ1 is defined as a first phase difference λ1, the time when the third switch Q3 is turned on is set earlier than the time when the first switch Q1 is turned on by the first phase difference λ1.

The first designated time δ1, as apparent from the above Eq. eq2, depends upon the first voltage V1r and the third voltage V3r. Specifically, the lower the level of the first voltage V1r, the shorter the first designated time δ1 is determined to be. The first designated time δ1 become zero when V3r/V1r is one. The first designated time δ1 also becomes longer as V3r/V1r is decreased from one.

The first phase difference λ1 is given by a relation of Ts/2×(V3r/V1r). The first phase difference λ1 will, thus, be Ts/2 when V3r/V1r is one and decreases as V3r/V1r becomes smaller.

The fifth switch Q5 and the sixth switch Q6 are turned on alternately. The seventh switch Q7 and the eighth switch Q8 are turned on alternately. The time when the seventh switch Q7 is turned off is delayed by the second designated time δ2 from the time when the fifth switch Q5 is turned on. In other words, if Ts/2−δ2 is defined as a second phase difference λ2, the time when the seventh switch Q7 is turned on is set earlier than the time when the fifth switch Q2 is turned on by the second phase difference λ2.

The second designated time δ2, as apparent from the above Eq. eq4, depends upon the second voltage V2r and the third voltage V3r. Specifically, the lower the level of the second voltage V2r, the shorter the second designated time δ2 is determined to be. The second designated time δ2 become zero when V3r/V2r is one. The second designated time δ2 also becomes longer as V3r/V2r is decreased from one.

The second phase difference λ2 is given by a relation of Ts/2×(V3r/V2r). The second phase difference λ2 will, thus, be Ts/2 when V3r/V2r is one and decreases as V3r/V2r becomes smaller.

The time lagging a value of δ1/2 behind the time when the first switch Q1 is turned on is defined as a reference timing.

When the first command phase φa is positive, the time lagging a value of δ2/2 behind the time when the fifth switch Q5 is turned on is set to be delayed the first command phase φa from the reference timing.

The ninth switch Q9 and the eleventh switch Q11 are turned on alternately. The eleventh switch Q11 and the twelfth switch Q12 are turned on alternately. The time when the tenth switch Q10 is turned off is delayed the third designated time δ3 from the time when the ninth switch Q9 is turned on. In other words, if Ts/2−δ3 is defined as a third phase difference λ3, the time when the eleventh switch Q11 is turned on is set earlier than the time when the ninth switch Q9 is turned on by the third phase difference λ3. In this embodiment, since the third designated time δ3 is selected to be zero, the time when the ninth switch Q9 is turned on coincides with when the eleventh switch Q11 is turned off. The ninth switch Q9 and the tenth switch Q10 are turned on alternately in half the switching cycle Ts/2. The eleventh switch Q11 and the twelfth switch Q12 are turned on alternately in half the switching cycle Ts/2.

When the second command phase φb is positive, the time delayed a value of δ3/2 behind the time when the ninth switch Q9 is turned on is set to be delayed by the second command phase φb from the reference timing. In this embodiment, since the third designated time δ3 is zero, the time when the ninth switch Q9 is turned on is delayed the second command phase φb from the reference timing.

In the switching operation in FIGS. 3(a) to 3(i), the transmission of electrical power is achieved by regulating the phase of the voltage Vt2 at the second coil 82 relative to that of the voltage Vt1 to the first command phase φa and also regulating the phase of the voltage Vt3 at the third coil 83 relative to that of the voltage Vt1 at the first coil 81 to the second command phase φb.

The first designated time δ1 is controlled depending upon the first voltage V1r and the third voltage V3r, so that the lower the third voltage V3r than the first voltage V1r, the lower a difference in effective value between the voltage Vt1 at the first coil 81 and the voltage Vt3 at the third coil 83. This causes electrical power to be delivered from the first storage battery 10 to the resistive load 30 and the third capacitor 71 through the first full-bridge circuit 50 and the third full-bridge circuit 70, thereby preventing overcurrent from flowing through the transformer 80, the third full-bridge circuit 70, the resistive load 30, and the third capacitor 71.

The second designated time δ2 is determined depending upon the second voltage V2r and third voltage V3r, so that the lower the third voltage V3r than the second voltage V2r, the lower a difference in effective value between the voltage Vt2 at the second coil 82 and the voltage Vt3 at the third coil 83. This causes electrical power to be delivered from the second storage battery 20 to the resistive load 30 and the third capacitor 71 through the second full-bridge circuit 60 and the third full-bridge circuit 70, thereby preventing overcurrent from flowing through the transformer 80, the third full-bridge circuit 70, the resistive load 30, and the third capacitor 71.

Figure 4A:
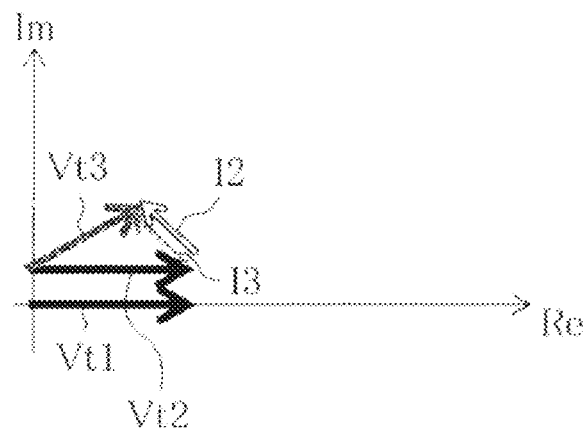
FIGS. 4(a) and 4(b) are views which illustrate complex planes demonstrating effects of reduction in overcurrent.
Figure 4B:
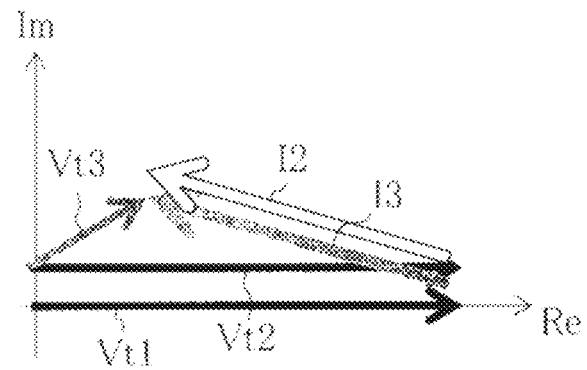

FIGS. 4(a) and 4(b) are views for explaining the reduction in overcurrent using current vectors on a complex plane. FIG. 4(a) illustrates for the embodiment. FIG. 4(b) illustrate for a comparative example. The comparative example is an example where the first designated time δ1 and the second designated time δ2 are both selected to be zero. In FIGS. 4(a) and 4(b), I2 denotes a vector of current flowing through the resistive load 30 and the third capacitor 71 when electrical power is delivered from the second storage battery 20 to the resistive load 30 and the third capacitor 71 through the second full-bridge circuit 60 and the third full-bridge circuit 70. I3 denotes a vector of current flowing the resistive load 30 and the third capacitor 71 when electrical power is delivered from the first storage battery 10 to the resistive load 30 and the third capacitor 71 through the first full-bridge circuit 50 and the third full-bridge circuit 70. FIGS. 4(a) and 4(b) show that the vectors I2 and I3 of current in this embodiment are smaller than those in the comparative example.

FIGS. 5(a) to 5(c) demonstrate changes in waveforms in the embodiment. FIG. 5(a) shows a change in electrical current in the transformer 80. FIG. 5(b) shows a change in voltage at the transformer 80. FIG. 5(c) shows a change in the third voltage V3r. In FIG. 5(a), IL1 represents electrical current flowing in the first coil 81. IL2 represents electrical current flowing in the second coil 82. IL3 represents electrical current flowing in the third coil 83.

It is possible for this embodiment to pre-charge the third capacitor 71 without the currents IL1 to IL3 exceeding an overcurrent threshold OC after the power converter 40 is started.

In the comparative example illustrated in FIGS. 6(a) to 6(c), the current IL3 exceeds the overcurrent threshold OC immediately after the power converter 40 is started, thereby resulting in shut-down of the power converter 40 due to the overcurrent. This results in a difficulty in completing the pre-charging of the third capacitor 71 and regulating the third voltage V3r to agree with the target value V3*.

The above embodiment offers the following beneficial advantages.

The first phase difference λ1 is determined to be decreased with a drop in the third voltage V3r. This enables the third capacitor 71 to be pre-charged completely, without a risk that overcurrent may flow through the transformer 80, the third full-bridge circuit 70, the resistive load 30, and the third capacitor 71.

Particularly, this embodiment determines the first phase difference λ1 as being decreased with a decrease in value of V3r/V1r. This minimizes the occurrence of overcurrent regardless of a variation in voltage at the first capacitor 51 or the third capacitor 71.

The ninth switch Q9 and the tenth switch Q10 are, as described above, turned on alternately, while the eleventh switch Q11 and the twelfth switch Q12 are turned on alternately. The time when the ninth switch Q9 is switched to the on-state and the time when the eleventh switch Q11 is switched to the on-state are offset from each other by Ts/2. This enhances the efficiency in transmitting electrical power from the first storage battery 10 to the resistive load 30.

The time when the ninth switch Q9 is switched to the on-state is delayed from that when the first switch Q1 is switched to the on-state. This avoids a counter flow of current from the third high-potential terminal CH3 or the third low-potential terminal CL3 to the first full-bridge circuit 50 through the third full-bridge circuit 70 and the transformer 80.

Modification of First Embodiment

The third designated time δ3 may be, as demonstrated in FIGS. 7(a) to 7(i), determined to be longer than zero. It is, however, advisable that the third designated time δ3 be selected to be as short as possible.

The calculation of the first designated time δ1 may be achieved using a predetermined fixed value without use of the first voltage V1r. Similarly, the calculation of the second designated time δ2 may be achieved using a predetermined fixed value without use of the second voltage V2r.

Second Embodiment

Figure 8:
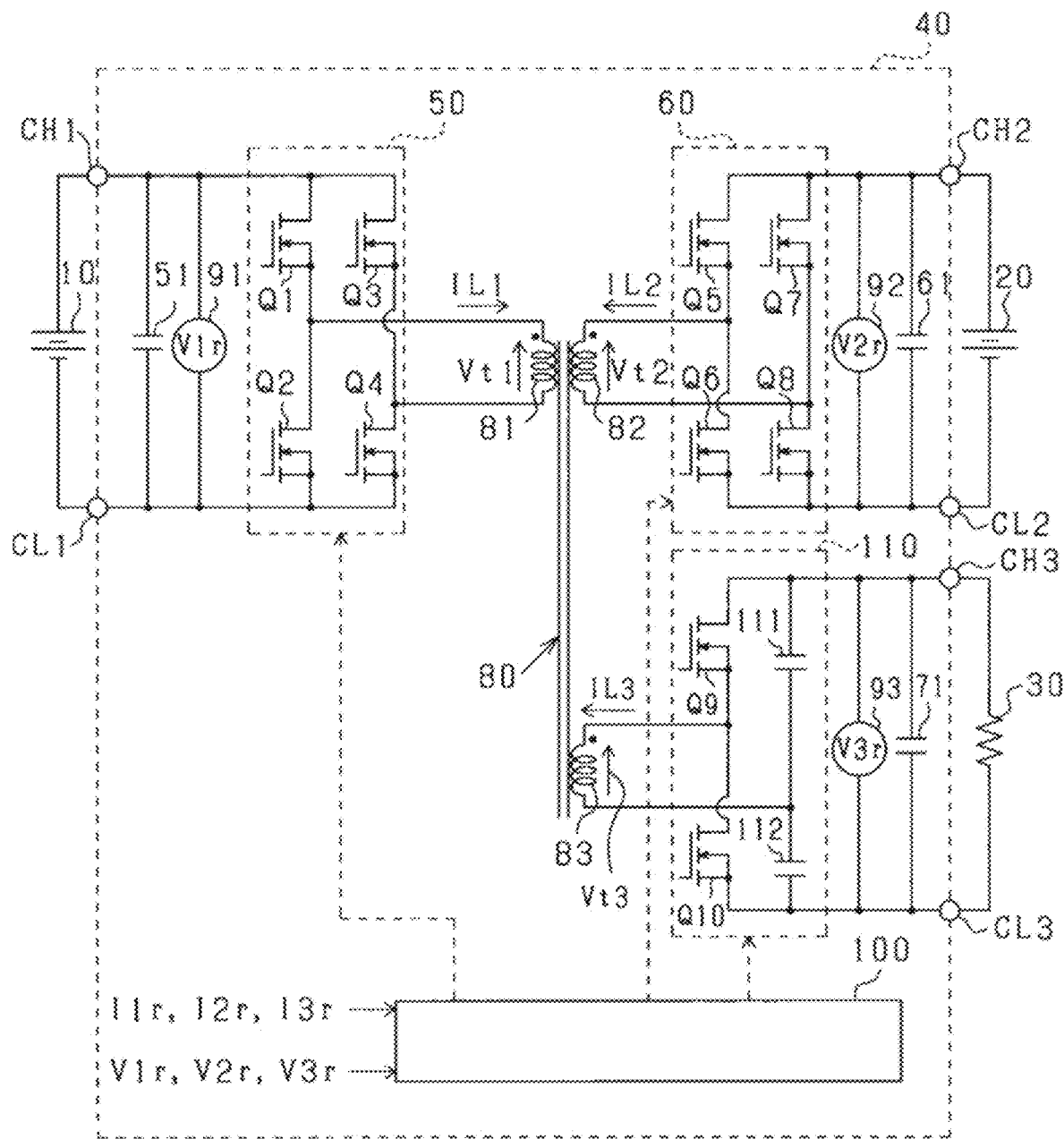
FIG. 8 is a view which illustrates a power converter according to the second embodiment.

The second embodiment will be described below in terms of differences between itself and the first embodiment. The second embodiment, as clearly illustrated in FIG. 8, uses the half-bridge circuit 110 instead of the third full-bridge circuit 70. In FIG. 8, the same reference numbers as employed in FIG. 1 refer to the same parts. FIG. 8 omits the current sensors 94 to 96 for the sake of convenience.

The half-bridge circuit 110 includes the ninth switch Q9, the tenth switch Q10, the first sub-capacitor 111, and the second sub-capacitor 112. The third high-potential terminal CH3 is connected to the drain of the ninth switch Q9 and the first end of the first sub-capacitor 111. The ninth switch Q9 is connected at the source thereof to the drain of the tenth switch Q10 and the first end of the third coil 83. The first sub-capacitor 111 is connected at the second end thereof to the first end of the second sub-capacitor 112 and the second end of the third coil 83. The third low-potential terminal CL3 is connected to the source of the tenth switch Q10 and the second end of the second sub-capacitor 112.

FIGS. 9(a) to 9(i) demonstrate operations of the switches Q1 to Q10. Specifically, FIGS. 9(a) to 9(f) and 9(i) correspond to FIGS. 3(a) to 3(f) and 3(i). FIGS. 9(g) and 9(h) show sequences of operations of the ninth switch Q9 and the tenth switch Q10.

The ninth switch Q9 and the tenth switch Q10 are turned on alternately. When the second command phase φb is positive, the time when the ninth switch Q9 is changed to the on-state is delayed by the second command phase φb from the reference timing.

This embodiment enables the number of switches installed in the half-bridge circuit 110 to be decreased to be smaller than that of the third full-bridge circuit 70 in the first embodiment.

Third Embodiment

Figure 10:
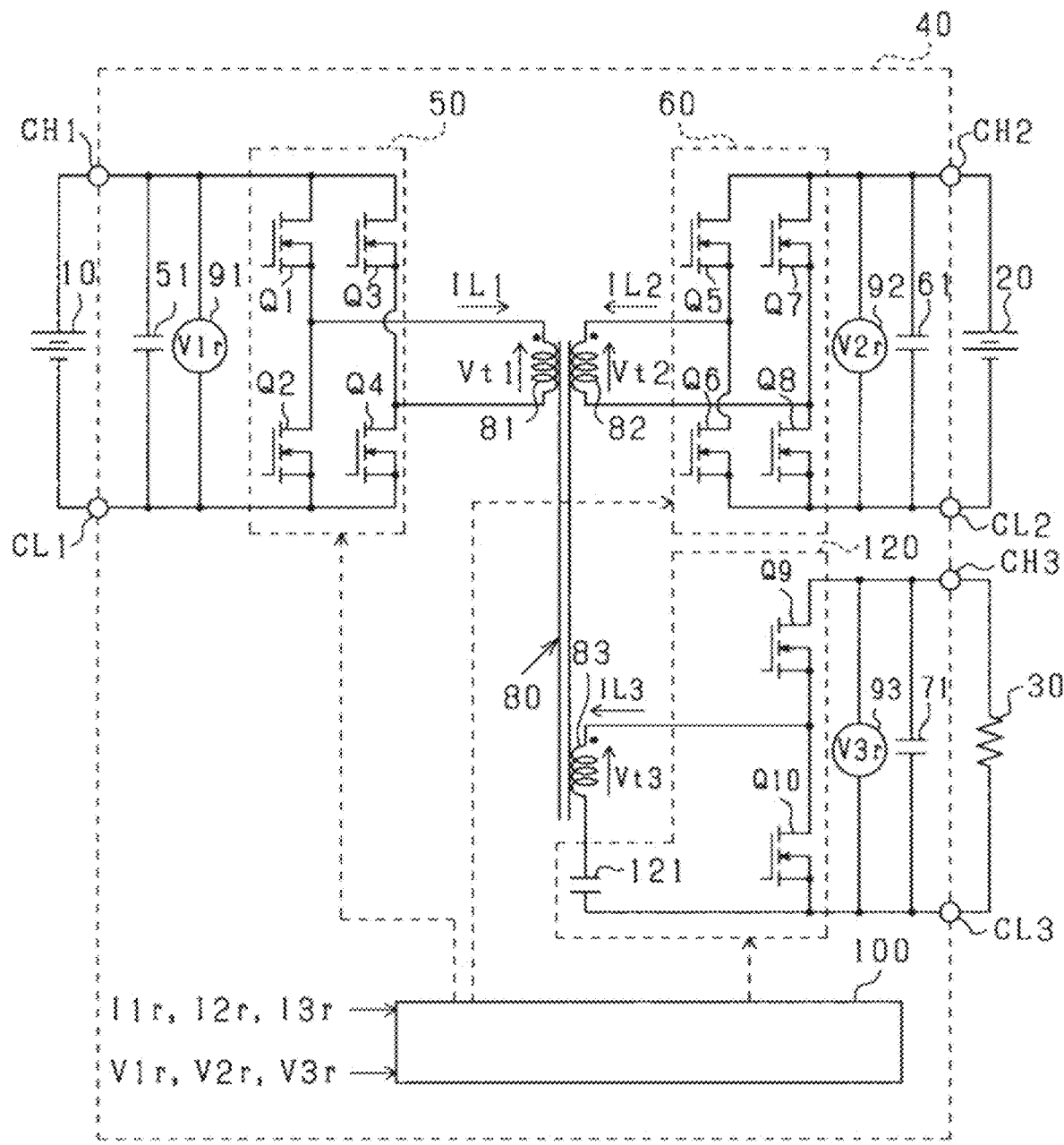
FIG. 10 is a view which illustrates a power converter according to the third embodiment.

The third embodiment will be described below in terms of differences between itself and the second embodiment. The third embodiment, as clearly illustrated in FIG. 10, uses the asymmetric half-bridge circuit 120. In FIG. 10, the same reference numbers as employed in FIG. 8 refer to the same parts. FIG. 10 omits the current sensors 94 to 96 for the sake of convenience.

The half-bridge circuit 120 includes the ninth switch Q9, the tenth switch Q10, and the sub-capacitor 121. The third high-potential terminal CH3 is connected to the drain of the ninth switch Q9. The ninth switch Q9 is connected at the source thereof to the drain of the tenth switch Q10 and the first end of the third coil 83. The third coil 83 is connected at the second end thereof to the first end of the sub-capacitor 121. The third low-potential terminal CL3 is connected to the second end of the sub-capacitor 121 and the source of the tenth switch Q10.

Figure 9:
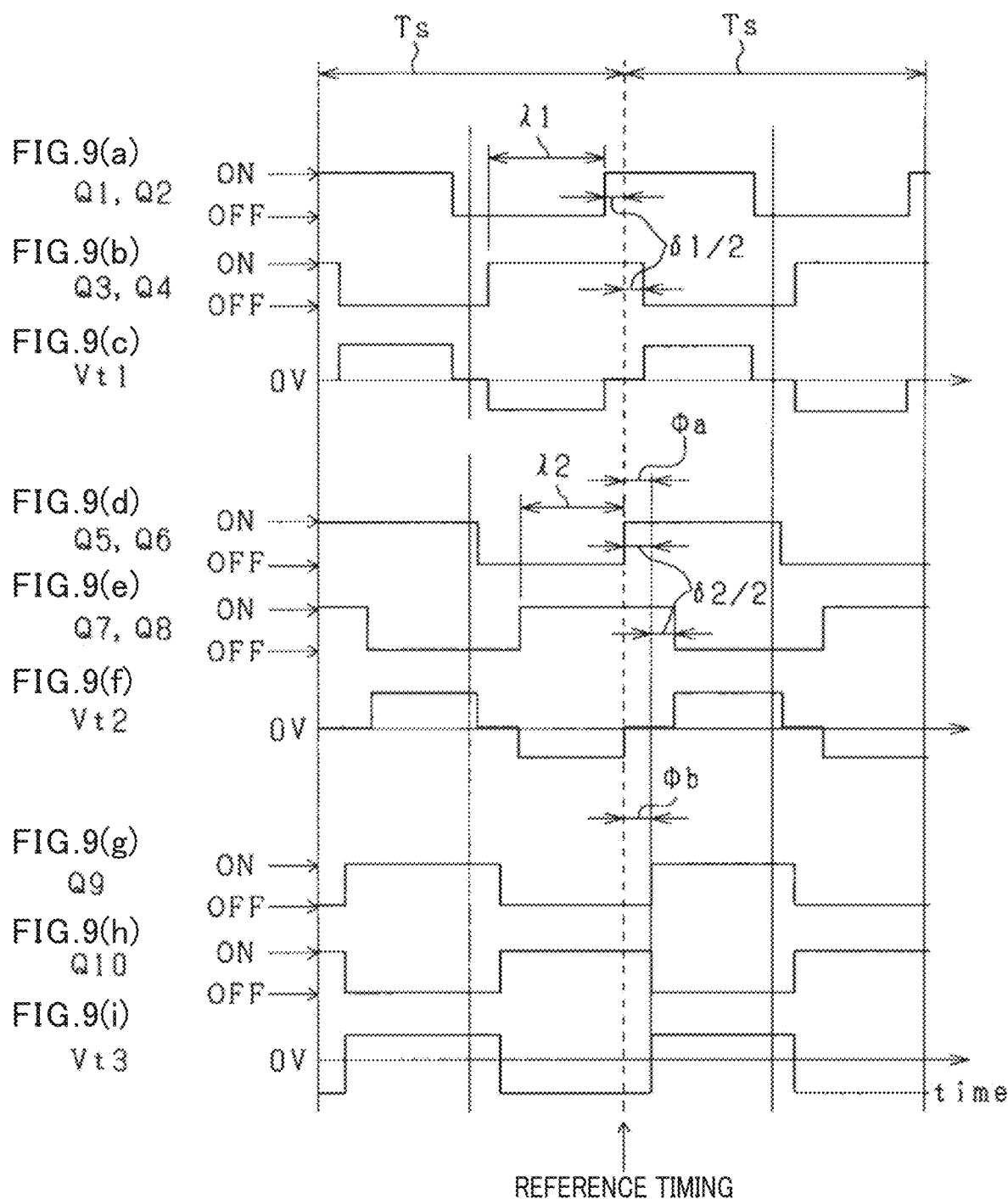
FIGS. 9(a) to 9(i) are timing charts which demonstrate sequences of operations of switches and a change in transformer voltage.

The operations of the switches Q1 to Q10 are identical with those in FIG. 9.

The above described third embodiment offers substantially the same beneficial advantages as in the second embodiment.

Fourth Embodiment

Figure 11:
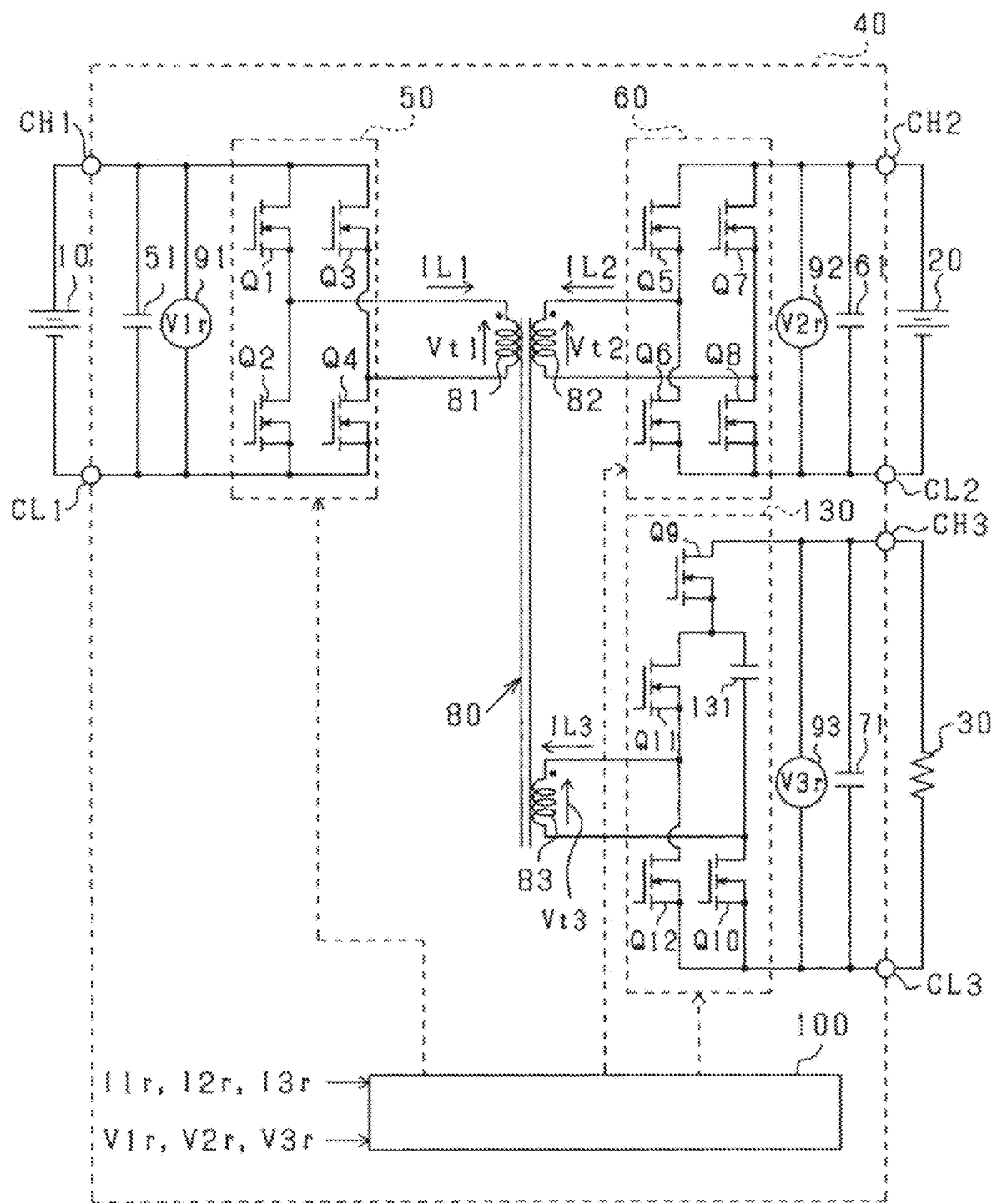
FIG. 11 is a view which illustrates a power converter according to the fourth embodiment.
Figure 12:
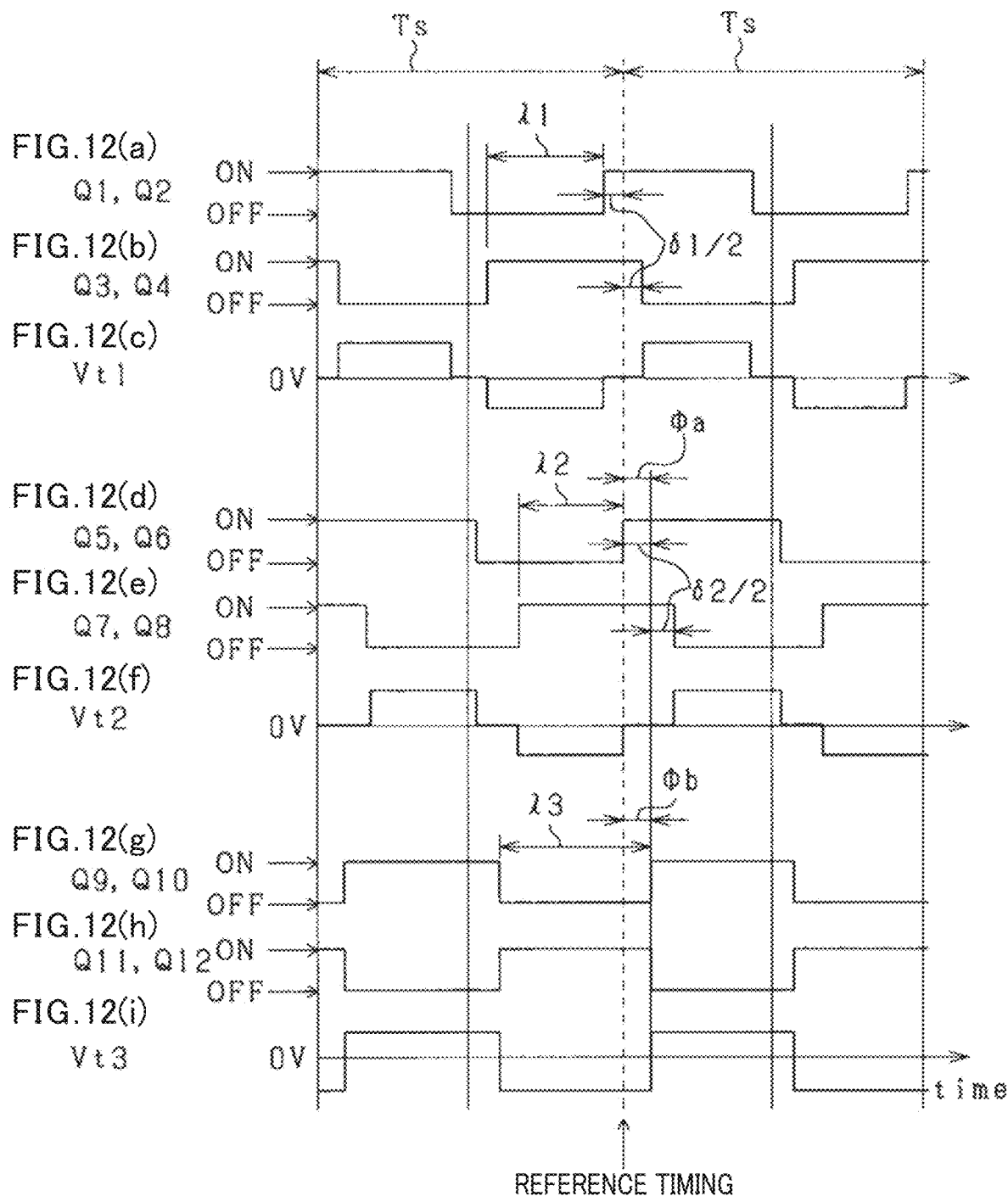
FIGS. 12(a) to 12(i) are timing charts which demonstrate sequences of operations of switches and a change in transformer voltage.

The fourth embodiment will be described below in terms of differences between itself and the first embodiment. The fourth embodiment, as clearly illustrated in FIG. 11, has a modification of the third full-bridge circuit 130. In FIG. 11, the same reference numbers as employed in FIG. 1 refer to the same parts. FIG. 11 omits the current sensors 94 to 96 for the sake of convenience.

The third full-bridge circuit 130 includes the ninth to twelfth switches Q9 to Q12 and the flying capacitor 131. The third high-potential terminal CH3 is connected to the drain of the ninth switch Q9. The ninth switch Q9 is connected at the source thereof to the drain of the eleventh switch Q11 and the first end of the flying capacitor 131. The eleventh switch Q11 is connected at the source thereof to the first end of the third coil 83 and the drain of the twelfth switch Q12. The flying capacitor 131 is connected at the second end thereof to the second end of the third coil 83 and the drain of the tenth switch Q10. The third low-potential terminal CL3 is connected to the sources of the tenth switch Q10 and the twelfth switch Q12.

FIGS. 12(a) to 12(i) demonstrate operations of the switches Q1 to Q12. Specifically, FIGS. 12(a) to 12(i) correspond to FIGS. 3(a) to 3(i). In this embodiment, the third designated time δ3 is also set to be zero.

The above structure of the third embodiment enables the level of voltage applied to the switches Q9 to Q12 of the third full-bridge circuit 130 to be reduced, thereby enabling the switches Q9 to Q12 to be made of low-voltage resistant switches.

Fifth Embodiment

Figure 13:
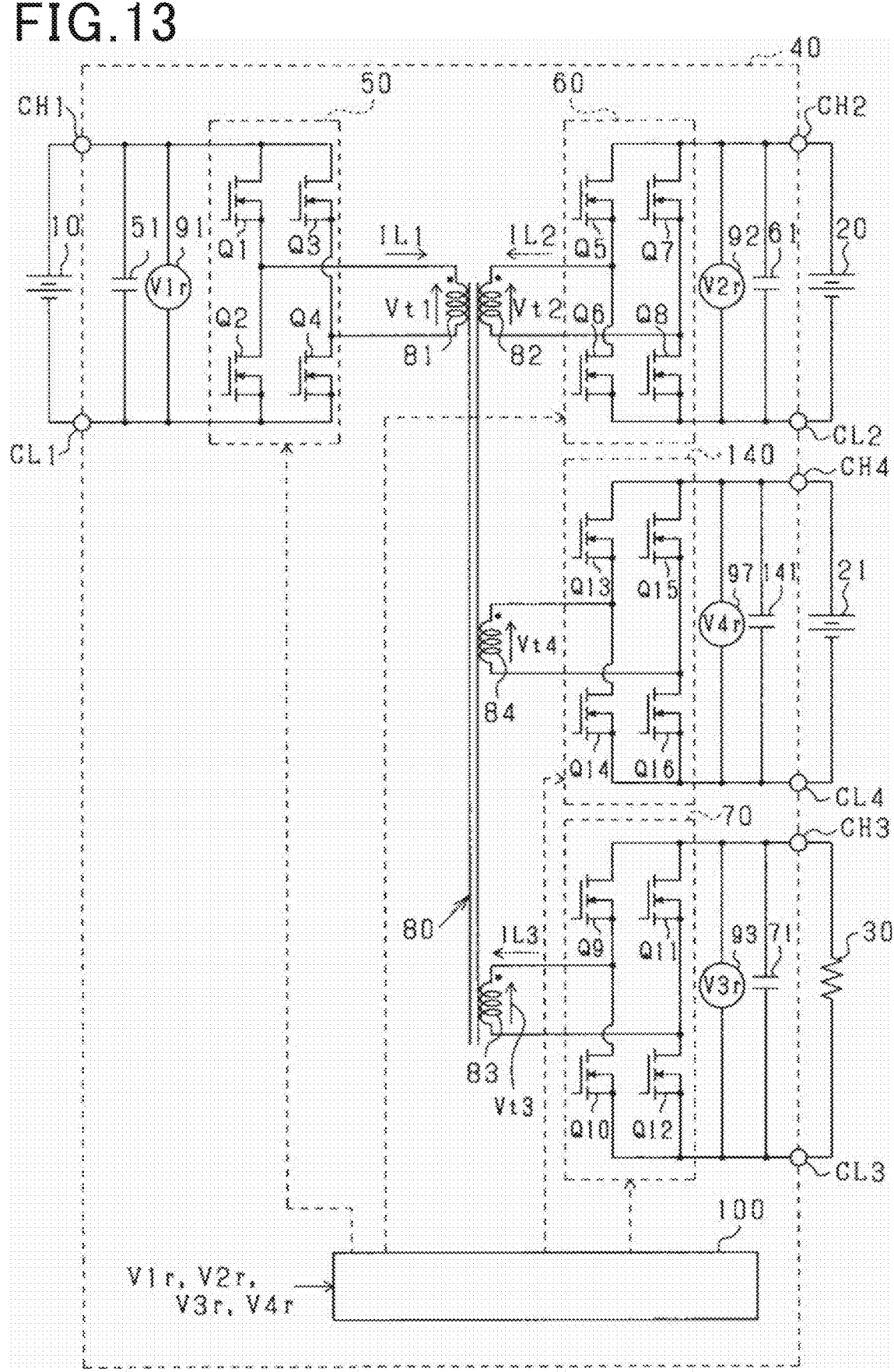
FIG. 13 is a view which illustrates a power converter according to the fifth embodiment.

The fifth embodiment will be described below in terms of differences between itself and the first embodiment. The fifth embodiment, as clearly illustrated in FIG. 13, has the power converter 40 equipped with the fourth full-bridge circuit 140. In FIG. 13, the same reference numbers as employed in FIG. 1 refer to the same parts. FIG. 13 omits current sensors for the sake of convenience.

The fourth full-bridge circuit 140 includes the thirteenth to sixteenth switches Q13 to Q16 and the fourth capacitor 141. In this embodiment, the thirteenth to sixteenth switches Q13 to Q16 are each made of an n-channel MOSFET. The fourth high-potential terminal CH4 of the power converter 40 is connected to the drains of the thirteenth switch Q13 and the fifteenth switch Q15. The thirteenth switch Q13 is connected at the source thereof to the drain of the fourteenth switch Q14. The fifteenth switch Q15 is connected at the source thereof to the drain of the sixteenth switch Q16. The fourth low-potential terminal CL4 of the power converter 40 is connected to the sources of the fourteenth switch Q14 and the sixteenth switch Q16. The fourth high-potential terminal CH4 is also connected to the first end of the fourth capacitor 141 and the positive terminal of the third storage battery 21. The fourth low-potential terminal CL4 is also connected to the second end of the fourth capacitor 141 and the negative terminal of the third storage battery 21. The rated voltage (e.g., 48V) of the third storage battery 21 is lower than that (e.g., 200V) of the second storage battery 20.

The transformer 80 is also equipped with the fourth coil 84. The fourth coil 84 is connected at the first end thereof to the source of the thirteenth switch Q13 and the drain of the fourteenth switch Q14. The fourth coil 84 is connected at the second end thereof to the source of the fifteenth switch Q15 and the drain of the sixteenth switch Q16. The fourth coil 84 is magnetically coupled with the first to third coils 81 to 83 through, for example, a core. When the potential at the first end of the first coil 81 is higher than that at the second end thereof, it will cause voltage to be induced at the fourth coil 84 which develops the potential at the first end thereof higher than that at the second end thereof.

The power converter 40 is equipped with the fourth voltage sensor 97. The fourth voltage sensor 97 works to measure the fourth voltage V4r that is a terminal voltage at the fourth capacitor 141. The fourth voltage V4r measured by the fourth voltage sensor 97 is inputted to the controller 100. The controller 100 serves to turn on or off the first to sixteenth switches Q1 to Q16.

The phase calculator 400 determines the fourth designated time δ4. The fourth designated time δ4 (≥0) is given by the following equation eq5.

$$\delta 4 = \frac{Ts}{2}\left(1 - \frac{V3r}{V4r} \cdot \frac{N4}{N3}\right) \quad \text{eq 5}$$

where N4 denotes the number of turns of the fourth coil 84.

Since N3=N4 in this embodiment, the above equation eq5 may be rewritten below.

$$\delta 4 = \frac{Ts}{2}\left(1 - \frac{V3r}{V4r}\right) \quad \text{eq 6}$$

The operations of the switches Q1 to Q16 will be described below with reference to FIGS. 14(a) to 14(l). FIGS. 14(a) to 14(i) correspond to FIGS. 3(a) to 3(i). FIGS. 14(j) and 14(k) demonstrate sequences of operations of the thirteenth to sixteenth switches Q13 to Q16. FIG. 14(l) demonstrates a change in voltage Vt4 at the fourth coil 84.

The thirteenth switch Q13 and the fourteenth switch Q14 are turned on alternately. The fifteenth switch Q15 and the sixteenth switch Q16 are turned alternately. The time when the fifteenth switch Q15 is switched to the off-state is delayed by the fourth designated time δ4 from that when the thirteenth switch Q13 is switched to the on-state. In other words, if Ts/2−δ4 is defined as a fourth phase difference λ4, the time when the fifteenth switch Q15 is turned on is set earlier than that when the thirteenth switch Q13 is turned on by the fourth phase difference λ4. When the first command phase φa is positive, the time delayed by δ4/2 from the time the thirteenth switch Q13 is turned on is delayed by the third command phase φc (>0) from the reference timing. The third command phase φc is, like the first command phase φa, a value required to transmit electrical power from the first storage battery 10 to the third storage battery 21 through the transformer 80 and the fourth full-bridge circuit 140.

The above described fifth embodiment offers substantially the same beneficial advantages as those in the first embodiment.

Other Embodiments

The operations of the controller in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the controller need not necessarily include software, but may be realized one or a plurality of hardware devices.

The above discussion has referred to the embodiments in this disclosure, but however, this disclosure is not limited to the above embodiments and may be realized in various ways without departing from the principle of the disclosure.

What is claimed is:

1. A power converter which is equipped with power transmitting terminals and power receiving terminals and to which a resistive load is connected to the power receiving terminal, comprising:
   a full-bridge circuit which includes a series-connected unit made of a first switch and a second switch and a series-connected unit made of a third switch and a fourth switch, each of the series-connected units being connected to the power transmitting terminals;
   a power converting circuit which is connected to the power receiving terminals;
   a transformer which includes a power transmitting coil and a power receiving coil, the power transmitting coil being connected to the full-bridge circuit, the power receiving coil being connected to the power converting circuit and magnetically coupled with the power transmitting coil;
   a power receiving voltage sensor which measures a voltage developed at the power receiving terminals;
   a power transmitting voltage sensor which measures a voltage at the power transmitting terminals; and
   a controller which works to turn on the first switch and the second switch alternately and also turn on the third switch and the fourth switch alternately, the controller serving to decrease a phase difference between a time when the first switch is turned on and a time when the third switch is turned on with a decrease in a value derived by dividing the voltage at the power receiving terminals which is measured by the power receiving voltage sensor by the voltage at the power transmitting terminals which is measured by the power transmitting voltage sensor.

2. The power converter as set forth in claim 1, wherein the power converting circuit is made of a full-bridge circuit including a series-connected unit made of a first converter switch and a second converter switch and a series-connected unit made of a third converter switch Q11 and a fourth converter switch Q12, and wherein the controller works to turn on the first converter switch and the second converter switch alternately and also turn on the third converter switch and the fourth converter switch alternately.

3. The power converter as set forth in claim 2, wherein the first converter switch, the second converter switch, the third converter switch, and the fourth converter switch are operated at the same switching cycle, and wherein the controller offsets a time when the first converter switch is turned on and a time when the third converter switch is turned on from each other by half the switching cycle.

4. The power converter as set forth in claim 3, wherein the controller serves to delay the time when the first converter switch is turned on from that when the first switch is turned on.

5. The power converter as set forth in claim 3, wherein the switching cycle of the first switch, the second switch, the third switch, and the fourth switch is identical with that of the first converter switch, the second converter switch, the third converter switch, and the fourth converter switch, and wherein the controller includes a first calculator and a second calculator, the first calculator calculating a designated time using the voltage at the power transmitting terminals and the voltage at the power receiving terminals, the second calculator calculating a command phase used to bring electrical current flowing through the power receiving terminals into agreement with a command value, and wherein the controller delays the time when the first converter switch is turned on by the command phase from a reference timing which is delayed by the designated time from the time when the first switch is turned on.

6. The power converter as set forth in claim 1, wherein the power converting circuit is implemented by a half-bridge circuit which includes a series-connected unit made of a first converter switch and a second converter switch and a series-connected unit made of a first capacitor and a second capacitor, each of the series-connected units being connected to the power receiving terminals and the power receiving coil, and wherein the controller works to turn on the first converter switch and the second converter switch alternately.

7. The power converter as set forth in claim 1, wherein the power converting circuit is implemented by an asymmetric half-bridge circuit which includes a series-connected unit and a capacitor, the series-connected unit being made of a first converter switch and a second converter switch, wherein the series-connected unit made of the first converter switch and the second converter switch and the capacitor being connected to the power receiving terminals and the power receiving coil, and wherein the controller turns on the first converter switch and the second converter switch alternately.

8. The power converter as set forth in claim 1, wherein the power converting circuit is made of a circuit which includes a series-connected unit made of a first converter switch, a capacitor, and a second converter switch and a series-connected unit which is made of a third converter switch and a fourth converter switch and connected in parallel to the capacitor and the second converter switch which are connected in series with each other, each of the series-connected units being connected to the power receiving terminals and the power receiving coil, and wherein the controller works to turn on the first converter switch and the second converter switch alternately and also turn on the third converter switch and the fourth converter switch alternately.

* * * * *